(12) United States Patent
Liu et al.

(10) Patent No.: US 9,913,340 B2
(45) Date of Patent: Mar. 6, 2018

(54) METHOD AND DEVICE FOR CONTROLLING ILLUMINATION LEVELS

(71) Applicant: Xiaomi Inc., Beijing (CN)

(72) Inventors: Lin Liu, Beijing (CN); Hui Du, Beijing (CN); Jingmin Feng, Beijing (CN)

(73) Assignee: Xiaomi Inc., Beijing (CN)

(*) Notice: Subject to any disclaimer, the term of this patent is extended or adjusted under 35 U.S.C. 154(b) by 0 days.

(21) Appl. No.: 15/388,049

(22) Filed: Dec. 22, 2016

(65) Prior Publication Data
US 2017/0105262 A1 Apr. 13, 2017

Related U.S. Application Data

(63) Continuation of application No. PCT/CN2015/093411, filed on Oct. 30, 2015.

(30) Foreign Application Priority Data

Mar. 25, 2015 (CN) .......................... 2015 1 0132328

(51) Int. Cl.
G08B 3/00 (2006.01)
H05B 33/08 (2006.01)
H05B 37/02 (2006.01)
G08B 5/36 (2006.01)

(52) U.S. Cl.
CPC .......... *H05B 33/0854* (2013.01); *G08B 5/36* (2013.01); *H05B 33/0872* (2013.01); *H05B 37/0218* (2013.01)

(58) Field of Classification Search
CPC ............ H05B 33/0854; H05B 33/0872; H05B 37/9218; H05B 33/0845; H05B 33/0833; H05B 41/38; G08B 21/18; G08B 21/182; G08B 5/36

USPC .......... 340/691.1, 691.8, 691.6, 540, 815.43, 340/815.4
See application file for complete search history.

(56) References Cited

U.S. PATENT DOCUMENTS

| 2011/0310073 A1 | 12/2011 | Nagata | |
| 2012/0169236 A1* | 7/2012 | Kim | H05B 33/0872 315/127 |
| 2013/0015770 A1* | 1/2013 | Aitken | G09G 3/3406 315/154 |
| 2013/0021308 A1* | 1/2013 | Ge | G09G 3/3406 345/207 |

(Continued)

FOREIGN PATENT DOCUMENTS

| CN | 101025881 A | 8/2007 |
| CN | 103857126 A | 6/2014 |

(Continued)

OTHER PUBLICATIONS

International Search Report and Written Opinion dated Feb. 2, 2016 for International Application No. PCT/CN2015/093411, 22 pages.

(Continued)

*Primary Examiner* — Anh V La
(74) *Attorney, Agent, or Firm* — Brinks, Gilson & Lione (57) ABSTRACT

Disclosed are method and device for controlling illumination, belonging to the field of display control technology. The method includes acquiring an environmental brightness, determining a illumination parameter of a visual indicator disposed at a mobile device based on the environmental brightness, and controlling the visual indicator to illuminate based on the illumination parameter.

15 Claims, 7 Drawing Sheets

(56) References Cited

U.S. PATENT DOCUMENTS

| | | | | |
|---|---|---|---|---|
| 2013/0328842 | A1* | 12/2013 | Barnhoefer | G09G 3/3406 345/207 |
| 2015/0289339 | A1* | 10/2015 | Wu | H05B 33/0872 315/152 |
| 2016/0093254 | A1* | 3/2016 | Li | G09G 3/3406 345/690 |

FOREIGN PATENT DOCUMENTS

| | | |
|---|---|---|
| CN | 104390181 A | 3/2015 |
| CN | 104812127 A | 7/2015 |
| JP | 2000-307686 A | 11/2000 |
| JP | 2003-161926 A | 6/2003 |
| JP | 2004-022646 A | 1/2004 |
| JP | 2009-005293 A | 1/2009 |
| JP | 2010-157360 A | 7/2010 |
| JP | 2014-003394 A | 1/2014 |
| JP | 2014-082793 A | 5/2014 |
| KR | 10-2006-0106046 A | 10/2006 |
| KR | 10-2014-0133679 A | 11/2014 |

OTHER PUBLICATIONS

Office Action dated Sep. 26, 2016 for Chinese Application No. 201510132328.3, 11 pages.
Office Action dated Aug. 29, 2017 for Japanese Application No. 2016-545304, 8 pages.
Office Action dated Aug. 11, 2017 for Korean Application No. 10-2016-7028418, 11 pages.

\* cited by examiner

METHOD AND DEVICE FOR CONTROLLING ILLUMINATION LEVELS

CROSS-REFERENCE TO RELATED APPLICATIONS

This application is a continuation of International Application No. PCT/CN2015/093411, filed with the State Intellectual Property Office of P. R. China on Oct. 30, 2015, which claims priority to Chinese Patent Application No. 201510132328.3, filed on Mar. 25, 2015, the entirety of all of which are incorporated by reference herein.

TECHNICAL FIELD

The present disclosure generally relates to controlling an illumination level of a visual indicator based on a detected environmental condition.

BACKGROUND

A mobile device, such as a mobile phone, a tablet computer and a multimedia player may be provided with a light emitting diode (LED) that is used to indicate a residual battery capacity, an incoming call, an incoming message, or other notifications to a user of the mobile device. However, when the LED is only controlled to emit light at a constant illumination level, the LED may appear too bright in a low light environment and too dark in a bright environment.

SUMMARY

According to a first exemplary embodiment of the present disclosure, there is provided a method for controlling illumination, including: acquiring an environmental brightness; determining a illumination parameter of a visual indicator disposed at a mobile device based on the environmental brightness; and controlling the visual indicator to illuminate based on the illumination parameter.

According to a second exemplary embodiment of the present disclosure, there is provided a device for controlling illumination, including: a brightness acquiring module, configured to acquire an environmental brightness; a parameter determining module, configured to determine a illumination parameter of a visual indicator disposed at a mobile device based on the environmental brightness; and a first control module, configured to control the visual indicator to illuminate based on the illumination parameter.

According to a third exemplary embodiment of the present disclosure, there is provided a device for controlling illumination, including: a processor; and a memory for storing instructions executable by the processor, in which the processor is configured to acquire an environmental brightness; determine a illumination parameter of a visual indicator disposed at a mobile device based on the environmental brightness; and control the visual indicator to illuminate based on the illumination parameter.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments may not represent all implementations consistent with the present disclosure. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Mobile devices such as smart phones, may be equipped to include one or more components for providing information to a user. For example, the mobile device may include a display screen for displaying words and images. The mobile device may also include speakers for outputting audible sounds. The mobile device may also include more discrete visual indicators. The visual indicator may be, for example, a light source such as a light emitting diode (LED), light bulb, a display (e.g., a liquid crystal display (LCD)), or other light source configured to emit light. The visual indicator may be controlled to present a simple message to the user. For example, a light emitting pattern emitted by the visual indicator may be controlled by the mobile device to indicate a certain predetermined message or state of the mobile device.

It follows that ensuring the user is able to view the visual indicator may provide an enhanced user experience. This disclosure describes embodiments for controlling and utilizing environmental sensors on the mobile device to gather environmental condition information, and controlling one or more visual indicators on the mobile device based on the gathered environmental information. For example, the environmental sensor may be a light sensor configured to detect lighting levels in a vicinity of the mobile device. The mobile device may then control one or more visual indicators to emit light at a set lighting level based on the detected lighting levels detected by the light sensor. When the mobile device includes a plurality of visual indicators at different locations on the mobile device, the mobile device may select one or more visual indicators to allow, or prevent, the selected visual indicators from emitting light based on the lighting levels detected by the light sensor.

Figure 1:
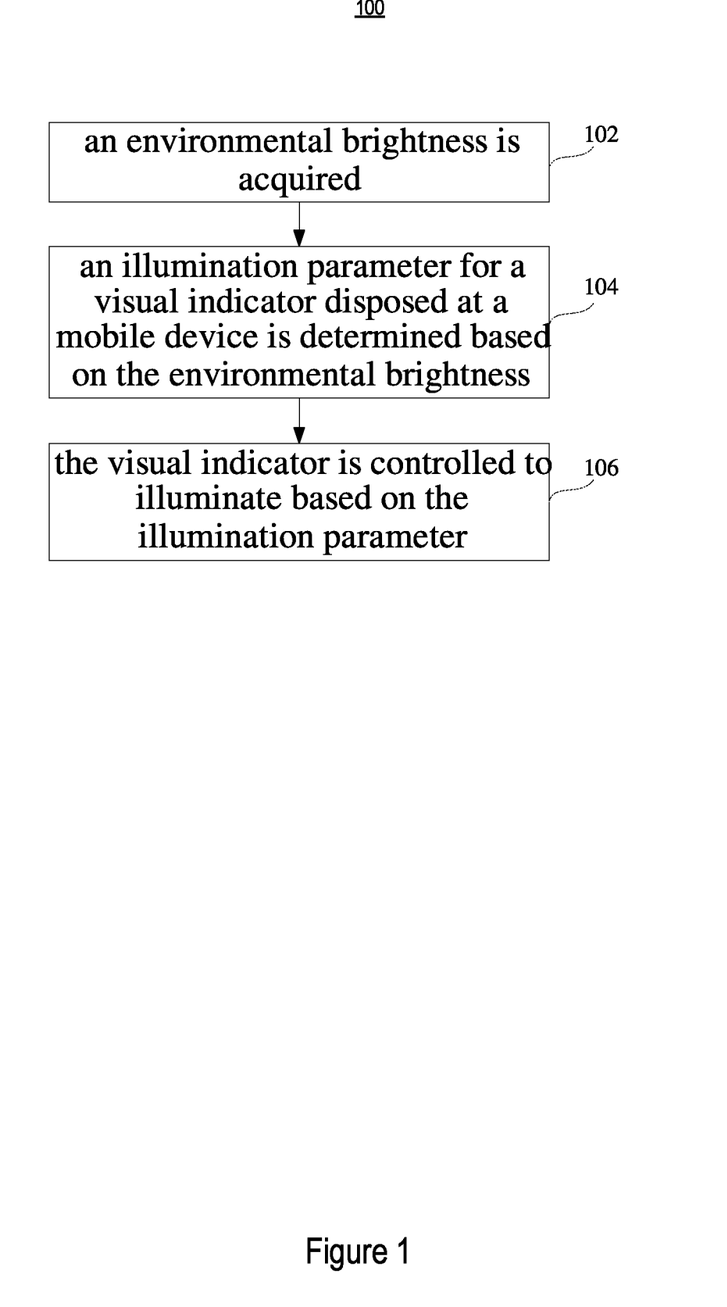
FIG. 1 illustrates a flow chart showing a method for controlling illumination according to an illustrative embodiment of the present disclosure.

FIG. 1 illustrates a flow chart 100 of logical processes for a method that may be implemented by a mobile device to control illumination of a visual indicator included in the mobile device according to an exemplary embodiment of the present disclosure. The mobile device may be a mobile phone, a tablet computer, or a personal digital assistant. The visual indicator may be, for example, an LED included in the mobile device. This method for controlling illumination of the visual indicator may include the following steps.

At 102, an environmental brightness may be acquired. For example, the mobile device may include a light sensor, such that the environmental brightness may be acquired based on the environmental brightness detected by the light sensor.

The environmental brightness may be information identifying a measurement in a known unit of brightness or illuminance such as, for example, Lumens or Lux, respectively. The environmental brightness may be acquired by the mobile device in real-time, or at intervals of a predetermined period, or prior to controlling the visual indicator.

At 104, an illumination parameter corresponding to a brightness level (or illuminance level or other known light emittance measuring level) for setting the visual indicator may be determined based on the acquired environmental brightness. The illumination parameter may identify, for example, a target illumination level, where the visual indicator may be controlled to illuminate at the target illumination level. The target illumination level may correspond to, for example, a brightness level or a color temperature for controlling the visual indicator to achieve.

For example, after the environmental brightness is acquired by the mobile device, the illumination parameter may be obtained by calculating based on a predetermined algorithm and the environmental brightness. The predetermined algorithm may be a nonlinear mapping of a luminous measurement (the measured environmental brightness) to an electrical current measurement (the illumination parameter). For example, 100 lux may be mapped to 16 mA, 500 lux may be mapped to 8 mA, 100 lux may be mapped to 4 mA, 50 lux may be mapped to 2 mA, and 10 lux may be mapped to 1 mA. According to some embodiments, relationship information identifying relationships between different environmental brightness levels and different illumination parameters may be stored in a memory of the mobile device in advance. This way, the acquired environmental brightness may be compared against the relationship information to identify a matching environmental brightness, and then identify a corresponding illumination parameter that corresponds to the matching environmental brightness. It follows that the illumination parameter of the visual indicator may be determined to be the corresponding illumination parameter from the relationship information.

At 106, the visual indicator may be controlled to illuminate according to the determined illumination parameter. For example, the electrical current being supplied to the visual indicator may be controlled to illuminate the visual indicator to achieve an illumination level identified by the illumination parameter.

The visual indicator may be dynamically controlled to illuminate on the mobile device based on the determined illumination parameter, where the illumination parameter may be determined based on an acquired environmental brightness detected by the light brightness sensor. It follows that the luminance of the visual indicator may be controlled based on the current environmental brightness surrounding the mobile device. In some embodiments, the visual indicator may be controlled to match the current environmental brightness surrounding the mobile device. For example, when the mobile device is operated in a dark low-light environment, the visual indicator may be dimmed to a lower light emitting level to match the surrounding dark low-light environment. This way, the user's viewing experience may be more comfortable as the user's eyes will be viewing the visual indicator that is closer matched to the surrounding environment.

Alternatively, the visual indicator may be an indicator light such as a dedicated light separate from a display included on the mobile device, or a portion of the display included on the mobile device, or a flash light disposed at the mobile device. Controlling activation of the visual indicator to emit light may be used by the mobile device to indicate a visual reminder related to a feature of the mobile device. For example, activation of the visual indicator to emit light may be initiated by the mobile device to present a visual reminder that represents the mobile device currently has a residual battery capacity lower than a predetermined value. The mobile device may also activation of the visual indicator to emit light to present a visual reminder representing an incoming call, an incoming message, or a push notification being transmitted by the mobile device or received by the mobile device. The visual indicator may be disposed at a screen side or non-screen side of the mobile device. For example, the visual indicator may be disposed at a rear-housing or side-housing of the mobile device. As described, the visual indicator may include a light-emitting diode (LED).

In an example, it may be understood that the screen side of the mobile device is provided with a visual indicator, and the non-screen side of the mobile device is provided with a flash light. The visual indicator may be a dedicated light separate from a display included on the mobile device, or a portion of the display included on the mobile device, or a flash light disposed at the mobile device. When the mobile device receives an incoming call, the mobile device firstly detects whether the screen is blocked. For example, the mobile device may reference a light sensor configured to face a common direction as a viewing direction of the screen and determine whether the light sensor is detecting light, and determine screen is being blocked when the detected light is below a predetermined threshold level. When the screen is a touch screen, the mobile device may reference touch sensors on the touch screen and determine the screen is being blocked based on a detection of a predetermined pattern in contact with the screen. When there is a camera included in the mobile device that faces a common direction as the viewing direction of the screen, the mobile device may access the camera and determine the screen is being blocked when the camera is determined to be covered. When there is a proximity sensor included in the mobile device, the proximity sensor may be utilized to detect a distance between the mobile device and an object, such that when the distance between the mobile device and the object is less than a predetermined distance, the mobile device may determine the screen is blocked.

In the case that the screen is determined not to be blocked, the mobile device determines an illumination parameter of the indicator light based on the current acquired environmental brightness and controls the indicator light to illuminate based on the illumination parameter of the indicator light. In the case that the screen is determined to be blocked, the mobile device determines a illumination parameter of the flash light based on the current acquired environmental brightness and controls the flash light to illuminate based on the illumination parameter of the flash light, so that the flash light may be able to emit light to provide a reminder to the user in the case that the screen and the indicator light of the mobile device are blocked.

By acquiring the current environmental brightness and then adjusting the illumination parameter of the visual indicator based on the environmental brightness, the method for controlling illumination provided solves a problem of inefficient or ineffective illumination of the visual indicator that may result due to the illumination parameter that controls an illumination level of the visual indicator being set to a constant value. The current mobile device allows the illumination parameter that is referenced to control an illumination level of the visual indicator to be dynamically adjusted based on the environmental brightness, so that the illumination of the visual indicator may be controlled in view of the environmental brightness, and thereby optimizing the illumination of the visual indicator under different levels of detected environmental brightness and thus improving the user's experience.

Figure 2:
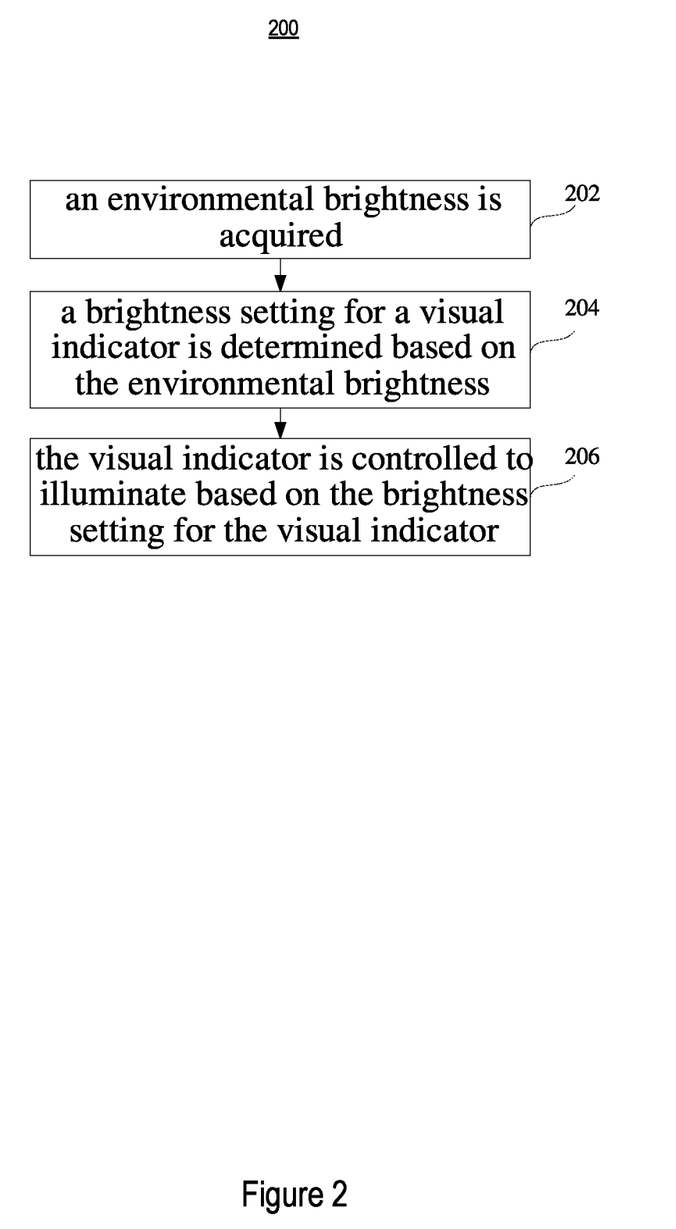
FIG. 2 illustrates a flow chart showing a method for controlling illumination according to another illustrative embodiment of the present disclosure.
Figure 3:
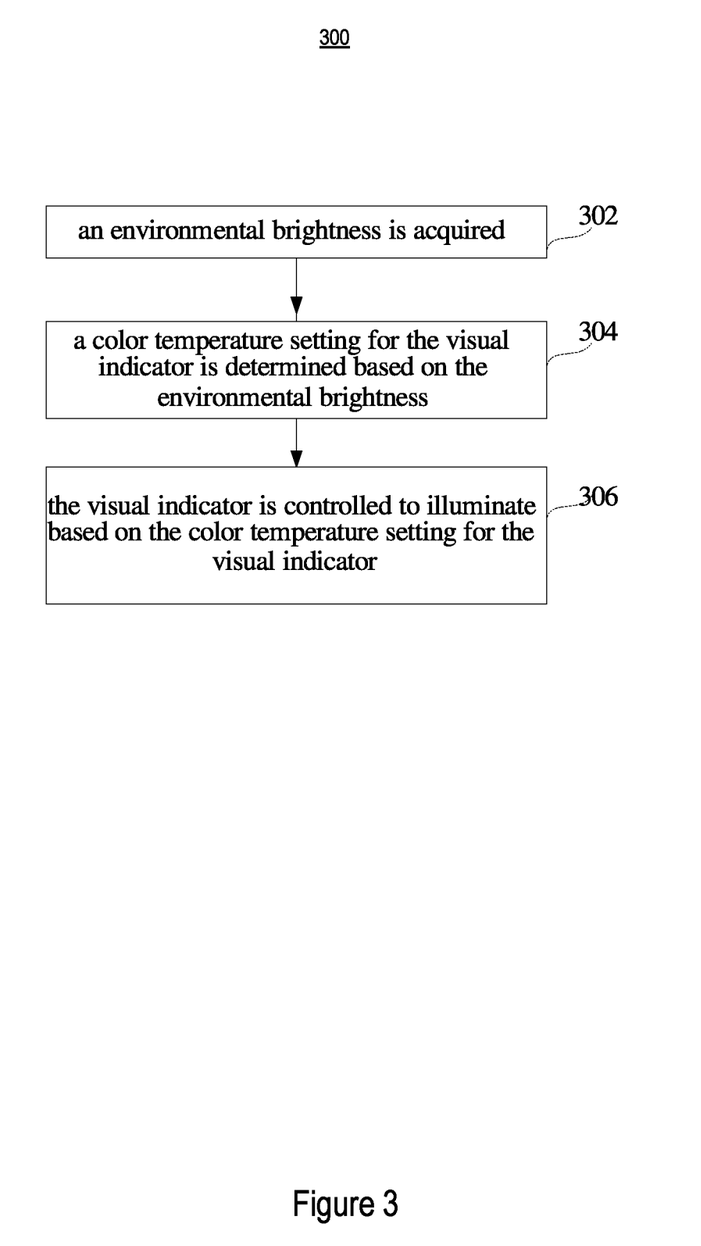
FIG. 3 illustrates a flow chart showing a method for controlling illumination according to a further illustrative embodiment of the present disclosure.

Examples of controlling the brightness and the color temperature of the visual indicator based on the environmental brightness are illustrated in embodiments, as shown in FIGS. 2 and 3, respectively.

FIG. 2 illustrates a flow chart 200 of logical processes for a method that may be implemented by a mobile device to control illumination of a visual indicator included in the mobile device according to another illustrative embodiment of the present disclosure. This method for controlling illumination of the visual indicator may include the following steps.

At 202, an environmental brightness may be acquired. For example, the environmental brightness may be acquired according to any one or more of the processes described herein.

For example, the mobile device may include a light sensor, such that the environmental brightness may be acquired based on the environmental brightness detected by the light sensor. The environmental brightness may be information identifying a measurement in a known unit of brightness such as, for example, Lumens. The environmental brightness may be acquired by the mobile device in real-time, or at intervals of a predetermined period, or prior to controlling the visual indicator.

At 204, a brightness for setting the visual indicator may be determined based on the acquired environmental brightness. For example a predetermined algorithm may be referenced for determining an electrical current to provide to the visual indicator to control the visual indicator to achieve the desired lighting level (e.g., luminance or brightness). The predetermined algorithm may be a nonlinear mapping of a luminous measurement (the measured environmental brightness) to an electrical current measurement (the illumination parameter). For example, 100 lux may be mapped to 16 mA, 500 lux may be mapped to 8 mA, 100 lux may be mapped to 4 mA, 50 lux may be mapped to 2 mA, and 10 lux may be mapped to 1 mA. The brightness of the visual indicator may be determined, for example, to match with the acquired environmental brightness within a vicinity of the visual indicator.

According to some embodiments, relationship information (e.g., the nonlinear mapping of the luminous measurement) identifying relationships between different environmental brightness levels and different illumination parameters may be stored in a memory of the mobile device in advance. This way, the acquired environmental brightness may be compared against the relationship information to identify a matching environmental brightness, and then identify a corresponding brightness that corresponds to the matching environmental brightness. It follows that the brightness of the visual indicator may be determined to be the corresponding illumination parameter from the relationship information. This solution may be effective because the environmental brightness may be proportional with the brightness of the visual indicator. For example, the higher the environmental brightness, the higher the brightness of the visual indicator may also be. Similarly, the lower the environmental brightness, the lower the brightness of the visual indicator may be.

In some embodiments, the mobile device may first determine a screen brightness of the mobile device based on the acquired environmental brightness, and then the brightness setting for the visual indicator may be determined based on the determined screen brightness. This solution may be effective because the brightness of the visual indicator may be controlled to be proportional with the screen brightness. Alternatively, the mobile device may control the screen display based on the screen brightness, where the screen brightness may be obtained from internal control measurements or a light sensor positioned to allow for the light sensor to measure the screen brightness.

At step 206, the mobile device may control the visual indicator to illuminate to a set level based on the determined brightness setting for the visual indicator.

The visual indicator may be controlled to illuminate by the mobile device based on the determined brightness setting for the visual indicator, so that the brightness of the visual indicator may be set in view of the current environmental brightness surrounding the mobile device. In some embodiments, the visual indicator may be controlled to match the current environmental brightness surrounding the mobile device.

The visual indicator may be an indicator light or a flash light disposed at the mobile device. Controlling activation of the visual indicator to emit light may be used by the mobile device to indicate a visual reminder related to a feature of the mobile device. For example, activation of the visual indicator to emit light may be initiated by the mobile device to present a visual reminder that represents the mobile device currently has a residual battery capacity lower than a predetermined value. The mobile device may also activation of the visual indicator to emit light to present a visual reminder representing an incoming call, an incoming message, or a push notification being transmitted by the mobile device or received by the mobile device. The visual indicator may be disposed at a screen side or non-screen side of the mobile device. For example, the visual indicator may be disposed at a rear-housing or side-housing of the mobile device. As described, the visual indicator may include a light-emitting diode (LED).

By acquiring the current environmental brightness and then adjusting the brightness of the visual indicator based on the acquired environmental brightness, the method for controlling illumination solves a problem of inefficient or ineffective illumination of the visual indicator that may result due to the brightness of the visual indicator of the mobile device being set to a constant value. The current mobile device allows the brightness of the visual indicator to be dynamically adjusted based on the acquired environmental brightness, so that the brightness of the visual indicator may be controlled in view of the environmental brightness, and thereby optimizing the illumination of the visual indicator under different levels of detected environmental brightness and thus improving the user's experience.

Besides, by adjusting the screen brightness based on the environmental brightness dynamically, the screen brightness and the brightness of the visual indicator may be controlled in view of each other (e.g., matched to one another), and further the mobile device may display optimal screen brightness and optimal brightness of the visual indicator for the user under different cases, and thereby improving the user's experience sufficiently.

FIG. 3 illustrates a flow chart 300 of logical processes for a method that may be implemented by a mobile device to control illumination of a visual indicator included in the mobile device according to a further illustrative embodiment of the present disclosure. This method for controlling illumination of the visual indicator may include the following.

At step 302, an environmental brightness may be acquired. For example, the environmental brightness may be acquired according to any one or more of the processes described herein.

The mobile device may include a light sensor, such that the environmental brightness may be acquired based on the environmental brightness detected by the light sensor. The environmental brightness may be information identifying a measurement in a known unit of brightness such as, for example, Lumens. The environmental brightness may be acquired by the mobile device in real-time, or at intervals of a predetermined period, or prior to controlling the visual indicator.

At step 304, a color temperature setting for the visual indicator may be determined based on the acquired environmental brightness.

The color temperature of the visual indicator may be determined by the mobile device based on the acquired environmental brightness. The color temperature is a physical quantity representing a light color of a light source in a unit of Kelvin (K). Different color temperatures may provide users different subjective visual perceptions. In general, light with a color temperature lower than 3300 K is perceived in a reddish color, which may provide users with a warm subjective visual perception. Light with a color temperature between 3300 K and 6000 K is perceived in a white color, which brings may provide users a refreshing subjective visual perception. Light with a color temperature higher than 6000 K is perceived in a blue color, which may bring users a chilly subjective visual perception.

As a result, whether the color temperature is matched with the environmental brightness may be dependent on the user's subjective visual perception. By way of examples, in environment with a lower environmental brightness, if the color temperature of the light source is too high and the light color is in a blue color, then it may bring the user a bleak subjective visual perception. In the environment with a higher environmental brightness, if the color temperature of the light source is too low and in a reddish color, then it may bring the user a sultry subjective visual perception.

In the present disclosure, the color temperature setting for the visual indicator may be determined by the mobile device based on the current environmental brightness, so that the color temperature of the visual indicator is matched with the environmental brightness. By way of examples, a low environmental brightness results in a low color temperature, so that the visual indicator is of a reddish light color, thereby bringing users the warmer subjective visual perception; and a high environmental brightness results in a high color temperature, so that the visual indicator is of a blue color, thereby bringing users the refreshing subjective visual perception.

According to some embodiments, the color temperature corresponding to the environmental brightness may be determined by the mobile device based on first predetermined correspondence information. Such first predetermined correspondence information may include a correspondence between different acquired environmental brightness levels and different color temperature settings. This way, the acquired environmental brightness may be compared against the first predetermined correspondence information to identify a matching color temperature, and then setting the color temperature of the visual indicator to a color temperature that corresponds to the matching color temperature.

In another alternative embodiment, a brightness range of the environmental brightness may be acquired by the mobile device. Then the color temperature corresponding to the acquired brightness range may be determined based on a second predetermined correspondence information. Such second predetermined correspondence information may include a correspondence between different brightness ranges and different color temperature settings. This way, the acquired brightness range may be compared against the second predetermined correspondence information to identify a matching color temperature, and then setting the color temperature of the visual indicator to a color temperature that corresponds to the matching color temperature.

The color temperature of the visual indicator may also be calculated by the mobile device on a basis of the environmental brightness and by predetermined algorithms.

At 306, the mobile device may control the visual indicator to illuminate to a set level based on the determined color temperature setting for the visual indicator.

The visual indicator may be controlled to illuminate to a set color temperature by the mobile device based on the determined color temperature of the visual indicator, so that the color temperature of the visual indicator may be set based, at least in part, on the acquired current environmental brightness. In some embodiments, the color temperature of the visual indicator may be set to match with the current environmental brightness.

Alternatively, the visual indicator may be an indicator light such as a dedicated light separate from a display included on the mobile device, or a portion of the display included on the mobile device, or a flash light disposed at the mobile device. Controlling activation of the visual indicator to emit light may be used by the mobile device to indicate a visual reminder related to a feature of the mobile device. For example, activation of the visual indicator to emit light may be initiated by the mobile device to present a visual reminder that represents the mobile device currently has a residual battery capacity lower than a predetermined value. The mobile device may also activation of the visual indicator to emit light to present a visual reminder representing an incoming call, an incoming message, or a push notification being transmitted by the mobile device or received by the mobile device. The visual indicator may be disposed at a screen side or non-screen side of the mobile device. For example, the visual indicator may be disposed at a rear-housing or side-housing of the mobile device. As described, the visual indicator may include a light-emitting diode (LED).

The screen brightness may first be determined by the mobile device based on the acquired environmental brightness, and the color temperature of the visual indicator may then be determined based on the determined screen brightness, so that the color temperature of the visual indicator corresponds with the screen brightness.

By acquiring the current environmental brightness and then controlling adjustment of the color temperature of the visual indicator based on the acquired environmental brightness, the method for controlling illumination solves a problem of inefficient or ineffective illumination of the visual indicator resulting from the color temperature of the visual indicator of the mobile device being set at a constant value. The current mobile device allows the color temperature of the visual indicator to be dynamically adjusted based on the acquired environmental brightness, so that the color temperature of the visual indicator may be controlled in view of the environmental brightness, and thereby optimizing the illumination of the visual indicator under different cases and thus improving the user's experience.

It should also be noted that after acquiring the current environmental brightness, the brightness and/or the color temperature of the visual indictor may be adjusted by the mobile device based on the environmental brightness.

Figure 4:
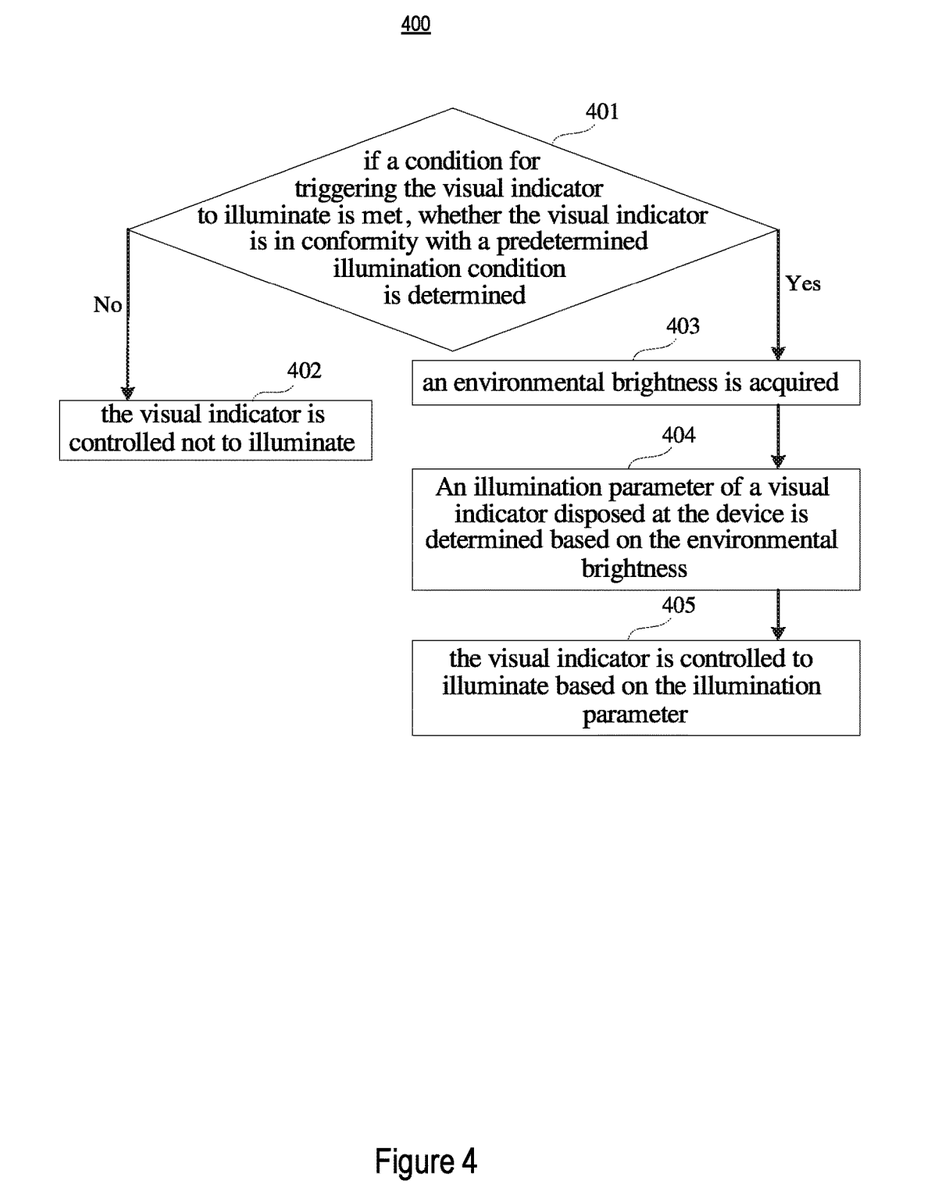
FIG. 4 illustrates a flow chart showing a method for controlling illumination according to a still further illustrative embodiment of the present disclosure.

FIG. 4 illustrates a flow chart 400 of logical processes for a method that may be implemented by a mobile device to control illumination of a visual indicator included in the mobile device according to a still further illustrative embodiment of the present disclosure. This method for controlling illumination of the visual indicator included in the mobile device may include the following steps.

At 401, when a condition for triggering the visual indicator to illuminate is determined to be satisfied, a further deamination is made as to whether the visual indicator is in conformity with a predetermined illumination condition.

The visual indicator may be disposed at the mobile device, for emitting a visual reminder, or other indicator, to users. The conditions for triggering the mobile device to control the visual indicator to illuminate may be configured in accordance with different configuration requirements. For example, when the light activation of the visual indicator is used to indicate a residual battery capacity of the mobile device, the condition for triggering the visual indicator to illuminate may be the mobile device being of a residual battery capacity lower than a predetermined value. For another example, when the light activation of the visual indicator is used to indicate an incoming call, an incoming message or a push notification, the condition for triggering the visual indicator to illuminate may be the incoming call, the incoming message or the push notification being received.

When the condition for triggering the visual indicator to illuminate is met, whether the visual indicator is in conformity with the predetermined illumination condition is determined by the mobile device. Such predetermined illumination condition refers to a predetermined condition allowing the visual indicator to illuminate.

For example, the predetermined illumination condition may include at least one of: a determination that a side of the mobile device on which the visual indicator is located is, or is not, facing down, or a determination that a current time coincides with a predetermined illumination period. The predetermined illumination period may correspond to a predetermined period allowing the visual indicator to illuminate.

When the side of the mobile device on which the visual indicator is located faces down, the visual indicator is likely to be blocked, such that the user may not be able to view the visual indicator and thus would be unaware of the visual reminder (e.g., light emitted from the visual indicator) being presented by the visual indicator. Thus, in order to save on a cost of operating the mobile device processing and reduce battery consumption of the mobile device, the visual indicator may be prevented from illuminating when the mobile device determines the mobile device is placed such that the side on which the visual indicator is located is facing down on a surface. In contrast, when the side at which the visual indicator is located is determined not to be facing down on a surface, i.e., the side at which the visual indicator is located faces up or on its side, the visual indicator is usually not blocked, such that the user may be able to view the visual indicator and be aware of the visual reminder emitted by the visual indicator. Thus, the visual indicator may be allowed to illuminate when the mobile determines the visual indicator is located on a side that is not facing down.

Further, the mobile device may determine whether the side at which the visual indicator is located faces down on a surface based on data collected by a built-in gravity sensor, gyroscope sensor, or another sensor configured to detect an orientation of the mobile device. After collecting a center-of-gravity position of the mobile device, the gravity sensor may determine whether the mobile device is in a vertical state, a horizontal state, a screen-facing up state, or a screen-facing down state, or other orientation, based on a basis of different center-of-gravity positions corresponding to different placing states of the mobile device.

The mobile device may also determine whether the side at which the visual indicator is located faces down with data collected by an optical sensor or a distance sensor. Taking the optical sensor as an example, the optical sensor may be disposed on the same side with the visual indicator, such that a sample value of light intensity from in front of the visual indicator may be detected by the optical sensor. When the value of light intensity detected by the optical sensor is lower than a predetermined threshold, the mobile device may determine that the visual indicator is blocked or the side at which the visual indicator is located is faced down on a surface. The predetermined threshold may be a certain constant value close to zero, or may be a variable per different times of the day to consider different environmental light levels. For example, the predetermined threshold may be slightly higher during day time, and a little lower at night.

In an example, the predetermined illumination condition may identify that the side at which the visual indicator is located is not facing down (or otherwise blocked), and the condition for triggering the massage indicator to illuminate is an incoming call being received. When receiving the incoming call, the mobile device determines whether the side at which the visual indicator is located faces down based on the center-of-gravity position data detected by the built-in gravity sensor. If the side at which the visual indicator is located is determined not to be facing down, then it may be determined that the visual indicator is in conformity with the predetermined illumination condition. If the side at which the visual indicator is determined to be facing down, then it may be determined that the visual indicator is not in conformity with the predetermined illumination condition.

In another example, the mobile device may be provided with an indicator light on the screen side, and a flash light at the non-screen side. Under normal circumstances, the indicator light may be taken as the visual indicator for emitting the visual reminder to users. When receiving the incoming call, the mobile device may determine whether the side at which the indicator light is located (e.g., the screen side) faces down or is otherwise blocked. If the side at which the indicator light is located is determined not to face down, then the mobile device may control the indicator light to illuminate via steps 403 to 405. If the side at which the indicator light is located is determined to face down, then this may indicate that the non-screen side at which the flash light is located does not face down, as such the mobile device may control the flash light to illuminate via steps 403 to 405, instead of the indicator light. The mobile device takes the flash light as a back-up visual indicator. In the case that the indicator light is determined to be blocked, the unblocked flash light may be used to emit the visual reminder to users, so as to effectively emit the visual reminder to users regardless of how to place the mobile device.

In another alternative embodiment, the predetermined illumination condition may be the current moment belonging to the predetermined illumination period.

Users may set a predetermined illumination period for the visual indicator as practical requirements. The visual indicator may be controlled to illuminate, or at least made eligible to illuminate, during the predetermined illumination period. Outside of the predetermined illumination period, the visual indicator may not be allowed to illuminate. For example, users may set a non-sleep period of 8:00 to 24:00 as the predetermined illumination period, such that the visual indicator is allowed to illuminate during the non-sleep period of 8:00 to 24:00 each day, while the visual indicator is not allowed to illuminate during the sleep period of 0:00 to 8:00 each day. When the condition for triggering the massage indicator to illuminate is satisfied, the mobile device determines whether the current moment belongs to the predetermined illumination period. If the current moment corresponds to the predetermined illumination period, it may indicate that the visual indicator is in conformity with the predetermined illumination condition. For example, when receiving an incoming call at 10:00, the mobile device determines that the visual indicator is in conformity with the predetermined illumination condition because 10:00 is within the predetermine illumination period of 8:00 to 24:00. Furthermore, if the current moment does not belong to the predetermined illumination period, it may indicate that the visual indicator is not in conformity with the predetermined illumination condition. For example, when receiving an incoming call at 4:00, the mobile device determines that the visual indicator is not in conformity with the predetermined illumination condition because 4:00 is beyond the predetermine illumination period of 8:00 to 24:00.

It should be noted that the predetermined illumination condition may include the determination that the visual indicator is located on a side of the mobile device that is not facing down, and/or the determination that the current moment belonging to the predetermined illumination period.

The predetermined illumination condition may also include both the side at which the visual indicator is located not facing down and the current moment belonging to the predetermined illumination period. For example, when receiving an incoming call, the mobile device determines whether the side at which the visual indicator is located faces down. If the mobile device determines that the side at which the visual indicator is located does not face down, the mobile device further determines whether the current moment belongs to the predetermined illumination period. Further, in the case that the current moment is determined belonging to the predetermined illumination period, then the visual indicator is determined being in conformity with the predetermined illumination condition. As long as the visual indicator is not in conformity with any one of the above two conditions, the visual indicator is determined being not in conformity with the predetermined illumination condition.

Other predetermined illumination conditions are also applicable. For example, the predetermined illumination condition may further include: the visual indicator being not blocked, a residual battery capacity of the mobile device being lower than a predetermined minimum value, among other conditions that may be detected on the mobile device.

Further, if the visual indicator is not in conformity with the predetermined illumination condition, then the following step 402 is performed. Otherwise, if the visual indicator is in conformity with the predetermined illumination condition, then the following steps 403 to 405 are performed.

At 402, the visual indicator may be controlled such that it does not illuminate, or is prevented from illuminating.

When the visual indicator is not in conformity with the predetermined illumination condition, the visual indicator may be controlled not to illuminate by the mobile device. As a result, it may not only save overhead of mobile device processing and reduce battery consumption, but also dynamically control the illumination of the visual indicator in accordance with user's configuration needs, thereby satisfying user's personalized needs and improving the use's experience.

At 403, an environmental brightness may be acquired. For example, the environmental brightness may be acquired according to any one or more of the processes described herein.

At 404, a illumination parameter corresponding to a brightness level (or illuminance level or other known light emittance measuring level) for setting the visual indicator may be determined based on the acquired environmental brightness. For example, the illumination parameter may be determined according to any one or more of the processes described herein.

The illumination parameter includes, but is not limited to, brightness, luminance, or color temperature.

At 405, the visual indicator may be controlled to illuminate based on the illumination parameter. For example, the visual indicator may be controlled to illuminate based on the illumination parameter according to any one or more of the processes described herein. When the visual indicator is in conformity with the predetermined illumination condition, the visual indicator may be controlled to illuminate by the mobile device. Besides, the step of controlling the visual indicator to illuminate by the mobile device, (e.g., the above steps 403 to 405 in embodiments as shown in FIGS. 1 to 3), has been introduced and described in detail, which is not repeated herein.

When the condition for triggering the massage indicator to illuminate is met, by determining whether the visual indicator is in conformity with the predetermined illumination condition and determining whether the visual indicator is controlled to illuminate based on the determined result, the method for controlling illumination provided in the present embodiment dynamically controls the illumination of the visual indicator in accordance with user's configuration needs, thereby satisfying user's personalized needs and improving the use's experience.

Figure 5:
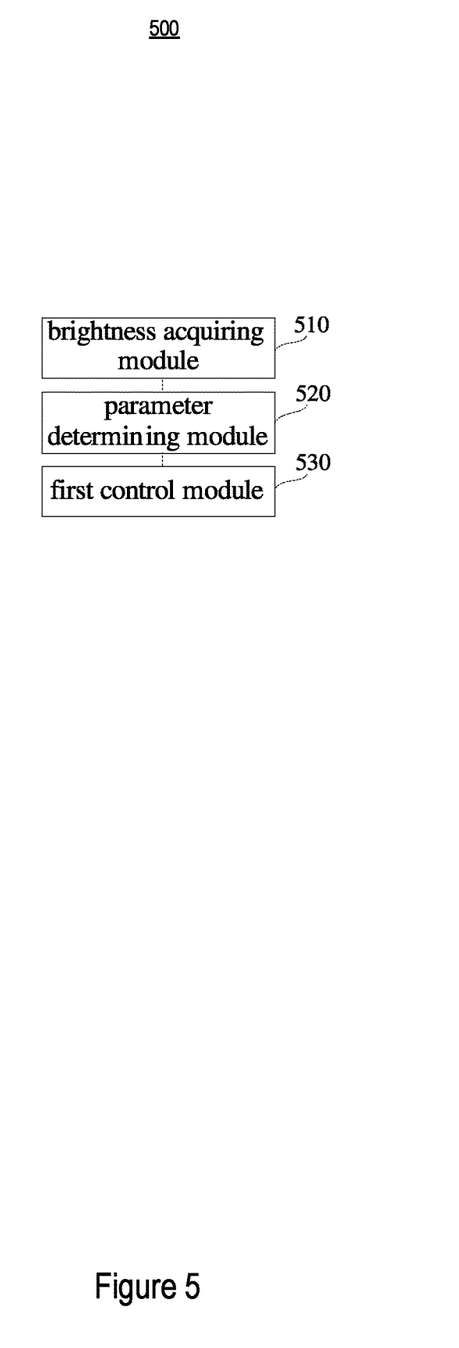
FIG. 5 illustrates a block diagram showing a device for controlling illumination according to an illustrative embodiment of the present disclosure.

FIG. 5 illustrates a diagram showing representative components of a device 500 for controlling illumination of a visual indicator on the device according to an illustrative embodiment of the present disclosure. Such device 500 may be a part or whole part of a mobile device. The device 500 for controlling illumination may include: a brightness acquiring module 510, a parameter determining module 520, and a first control module 530. A module may be a representation of software, hardware, circuitry, or a combination thereof.

The brightness acquiring module 510 may be configured to acquire an environmental brightness. The brightness acquiring module 510 may be configured to acquire the environmental brightness according to any one or more of the processes described herein.

The parameter determining module 520 may be configured to determine a illumination parameter for setting a brightness setting of the visual indicator disposed on the mobile device based on the acquired environmental brightness. The parameter determining module 520 may be configured to determine the illumination parameter of the visual indicator disposed at a mobile device based on the acquired environmental brightness according to any one or more of the processes described herein.

The first control module 530 may be configured to control the visual indicator to illuminate based on the determined illumination parameter. The first control module 530 may be configured to control the visual indicator to illuminate based on the determined illumination parameter according to any one or more of the processes described herein.

By acquiring the current environmental brightness and then adjusting the illumination parameter of the visual indicator based on the environmental brightness, the device 500 for controlling illumination solves a problem of inefficient or ineffective illumination of the visual indicator resulting from the illumination parameter of the visual indicator of the mobile device being a constant value. This allows the illumination parameter of the visual indicator to be dynamically adjusted based on the environmental brightness, so that the illumination of the visual indicator may be matched with the environmental brightness, and thereby optimizing the illumination of the visual indicator under different cases and thus improving the user's experience.

Figure 6:
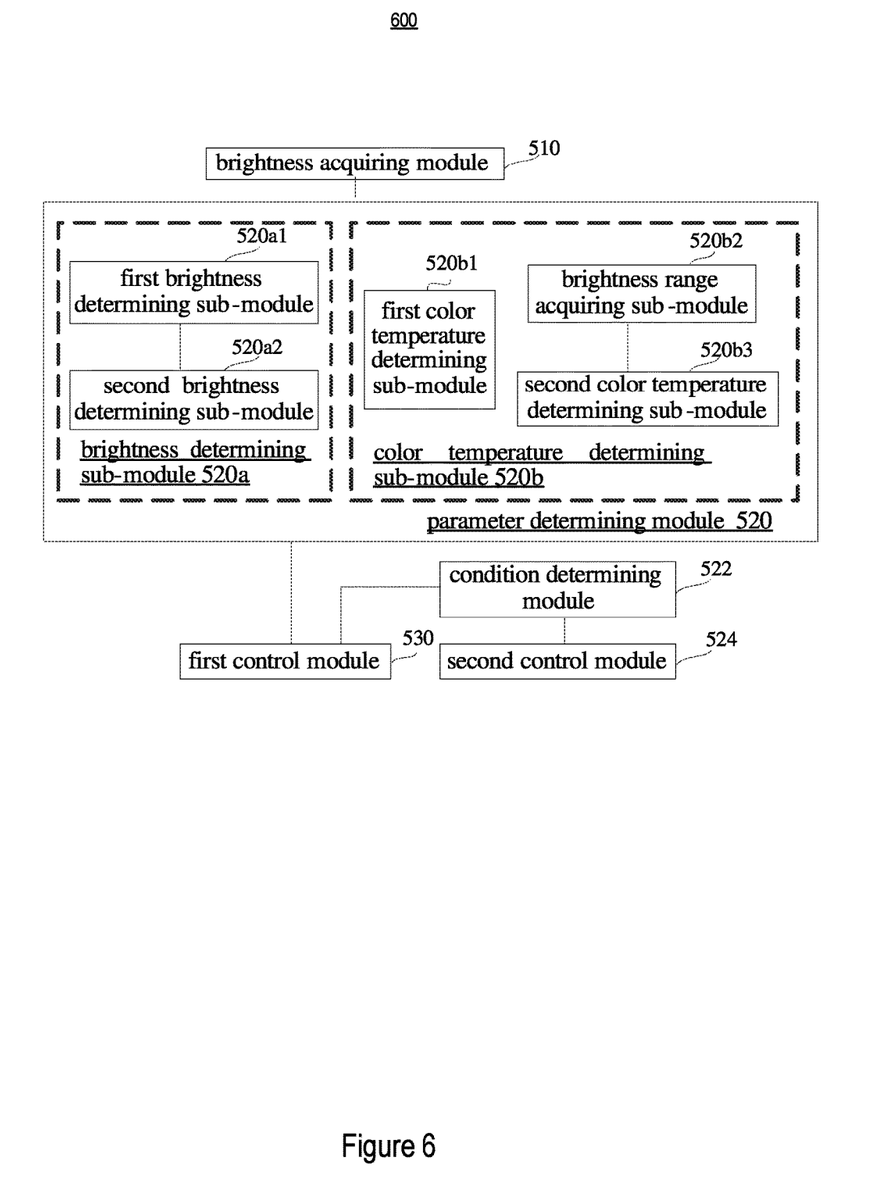
FIG. 6 illustrates a block diagram showing a device for controlling illumination according to another illustrative embodiment of the present disclosure.

FIG. 6 illustrates a block diagram showing a device 600 for controlling illumination of a visual indicator according to another illustrative embodiment of the present disclosure. Such device 600 for controlling illumination may be a part or whole part of a mobile device. The device 600 for controlling illumination may include: a brightness acquiring module 510, a parameter determining module 520, and a first control module 530. A module may be a representation of software, hardware, circuitry, or a combination thereof.

The brightness acquiring module 510 may be configured to acquire an environmental brightness. The brightness acquiring module 510 may be configured to acquire the environmental brightness according to any one or more of the processes described herein.

The parameter determining module 520 may be configured to determine a illumination parameter of the visual indicator disposed on the mobile device based on the acquired environmental brightness. The parameter determining module 520 may be configured to determine the illumination parameter of the visual indicator disposed on the mobile device based on the acquired environmental brightness according to any one or more of the processes described herein.

The first control module 530 may be configured to control the visual indicator to illuminate based on the determined illumination parameter. The first control module 530 may be configured to control the visual indicator to illuminate based on the determined illumination parameter according to any one or more of the processes described herein.

The parameter determining module 520 may include a brightness determining sub-module 520a.

The brightness determining sub-module 520a may be configured to determine a brightness of the visual indicator based on the acquired environmental brightness.

The brightness determining sub-module 520a may include a first brightness determining sub-module 520a1 and a second brightness determining sub-module 520a2.

The first brightness determining sub-module 520a1 may be configured to determine a screen brightness of a screen included in the mobile device based on the acquired environmental brightness.

The second brightness determining sub-module 520a2 may be configured to determine the brightness of the visual indicator based on the screen brightness of the screen included on the mobile device.

The screen brightness may be controlled to be in proportion with the brightness of the visual indicator.

The parameter determining module 520 may include a color temperature determining sub-module 520b.

The color temperature determining sub-module 520b may be configured to determine a color temperature of the visual indicator based on the acquired environmental brightness.

The color temperature determining sub-module 520b may include: a first color temperature determining sub-module 520b1, configured to determine a color temperature corresponding to the acquired environmental brightness based on a first predetermined correspondence including a correspondence between the environmental brightness and the color temperature.

The color temperature determining sub-module 520b may include: a brightness range acquiring sub-module 520b2, configured to acquire a brightness range of the environmental brightness; and a second color temperature determining sub-module 502b3, configured to determine a color temperature corresponding to the brightness range based on a second predetermined correspondence including a correspondence between the brightness range and the color temperature.

The device 600 may further includes: a condition determining module 522 and a second control module 524.

The condition determining module 522 may be configured to determine whether the visual indicator is in conformity with a predetermined illumination condition, if a condition for triggering the massage indicator to illuminate is met, the predetermined illumination condition referring to a predetermined condition allowing the visual indicator to illuminate.

The second control module 524 may be configured to control the visual indicator not to illuminate, in the case that the visual indicator is not in conformity with the predetermined illumination condition.

The first control module 530 may be further configured to control the visual indicator to illuminate based on the illumination parameter, in the case that the visual indicator is in conformity with the predetermined illumination condition.

The predetermined illumination condition may include at least one of: a side at which the visual indicator is located not facing down; and a current moment belonging to a predetermined illumination period, in which the predetermined illumination period refers to a predetermined period allowing the visual indicator to illuminate.

The visual indicator may be an indicator light such as a dedicated light separate from a display included on the mobile device, or a portion of the display included on the mobile device, or a flash light disposed at the mobile device.

By acquiring the current environmental brightness and then adjusting the illumination parameter of the visual indicator based on the acquired environmental brightness, the device 600 for controlling illumination solves a problem of inefficient or ineffective illumination of the visual indicator resulting from the illumination parameter of the visual indicator of the mobile device being a constant value. This allows the illumination parameter of the visual indicator to be dynamically adjusted based on the acquired environmental brightness, so that the illumination of the visual indicator may be matched with the environmental brightness, and thereby optimizing the illumination of the visual indicator under different cases and thus improving the user's experience.

Figure 7:
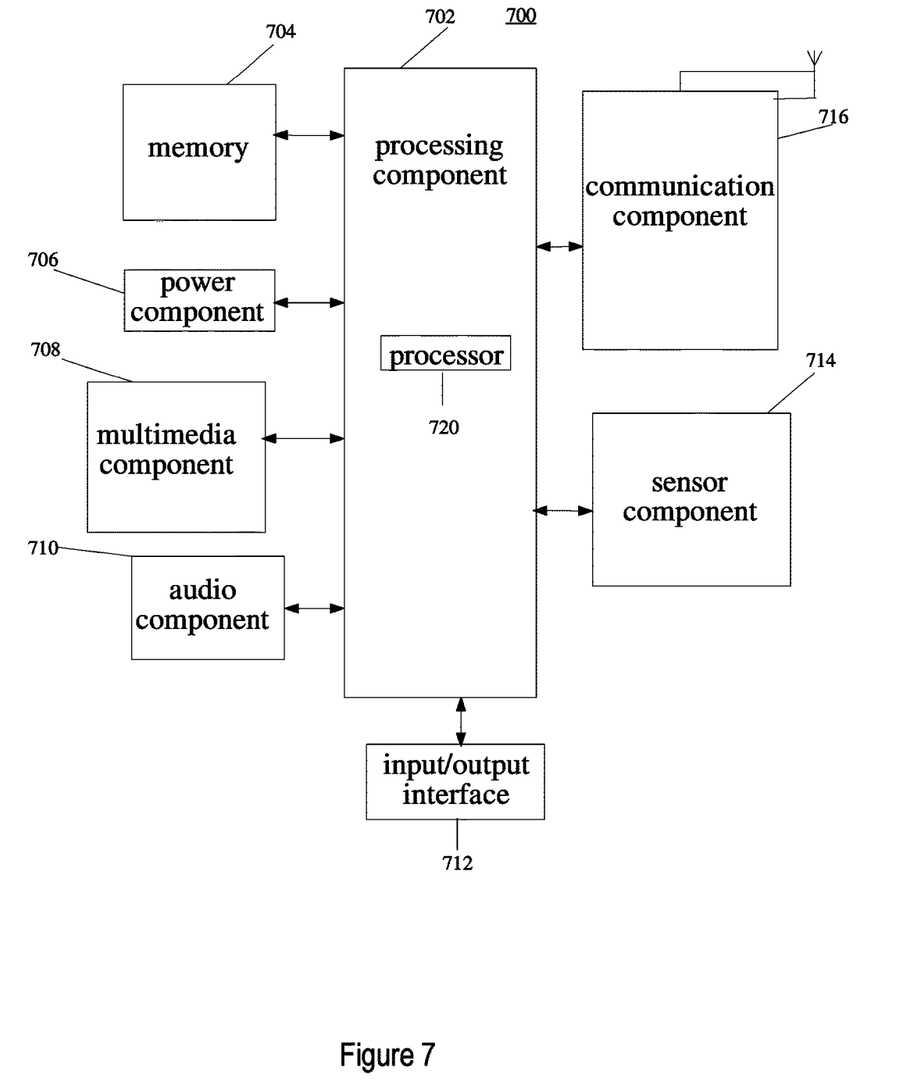
FIG. 7 illustrates a block diagram showing a device according to an illustrative embodiment of the present disclosure.

FIG. 7 illustrates a block diagram showing a device 700 according to an illustrative embodiment of the present disclosure. For example, the device 700 may be a mobile phone, a computer, a digital broadcasting mobile device, a message sending and receiving device, a game console, a flat panel device, a medical device, a fitness device, a personal digital assistant, or another computing device. The mobile device 700 may be representative of any of the devices described herein.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module 708 to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2Q or 3Q or a combination thereof. In one exemplary embodiment, the communication component 716 receives a broadcast signal or broadcast associated a message from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In addition, the device 700 is further provided with a visual indicator that may be included, for example, as part of the multimedia component 708 or sensor component 714. In an illustrative embodiment, the visual indicator may be an indicator light such as a dedicated light separate from a display included on the mobile device, or a portion of the display included on the mobile device, or a flash light disposed at the device 700. The visual indicator may be controlled to emit a visible light that represents a visual reminder to users. For example, the visual indicator may be used to indicate a message such as a battery level, an incoming call, an incoming message, and a push notification. The visual indicator may be disposed at a screen side of the device 700, or a non-screen side of the device 700. For example, the visual indicator is disposed at a rear- or side-housing of the device 700. Alternatively, the visual indicator is composed of LED.

In illustrative embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In illustrative embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of the device 700, causes the device 700 to perform a method for controlling illumination provided in embodiments as shown in FIG. 1, 2, 3, or 4.

Other embodiments will be apparent to those skilled in the art from consideration of the specification and practice of the features disclosed here. This application is intended to cover any variations, uses, or adaptations of the features following the general principles thereof and including such departures from the present disclosure as come within known or customary practice in the art. It is intended that the specification and examples be considered as exemplary only, with a true scope and spirit of the features being indicated by the following claims.

It will be appreciated that the features described in the present disclosure are not limited to the exact construction that has been described above and illustrated in the accompanying drawings, and that various modifications and changes can be made without departing from the scope thereof. It is intended that the scope only be limited by the appended claims.

What is claimed is:

1. A method for controlling illumination of a visual indicator included on a device, comprising:
   controlling a sensor to acquire environmental information representing an environmental illumination level within a vicinity of the device, wherein the visual indicator comprises a light configured to indicate a state of the device;
   determining an illumination parameter for the visual indicator based on the acquired environmental brightness information; and
   controlling an illumination level of the visual indicator based on the determined illumination parameter;
   wherein determining the illumination parameter comprises:
      determining a target brightness of the visual indicator based on the acquired environmental information; and
   wherein determining the target brightness of the visual indicator comprises:
      determining a display brightness of a display included on the device based on the acquired environmental information; and
      determining the target brightness of the visual indicator to be in proportion with the determined display brightness.

2. The method according to claim 1, wherein determining the illumination parameter comprises:
   determining a color temperature of the visual indicator based on the acquired environmental information.

3. The method according to claim 2, wherein determining the color temperature of the visual indicator comprises:
   determining the color temperature based on a first predetermined correspondence between the acquired environmental information and the color temperature.

4. The method according to claim 2, wherein determining the color temperature of the visual indicator comprises:
   acquiring a brightness range of the acquired environmental brightness information; and
   determining the color temperature corresponding to the acquired brightness range based on a second predetermined correspondence comprising a correspondence between the acquired brightness range and the color temperature.

5. The method according to claim 1, further comprising:
   when a condition for triggering the visual indicator to illuminate is met, determining whether the visual indicator satisfies a predetermined illumination condition, wherein the predetermined illumination condition corresponds to a predetermined condition for controlling the visual indicator to illuminate;
   controlling the visual indicator to not illuminate when the visual indicator is determined not to satisfy the predetermined illumination condition; and
   controlling the visual indicator to illuminate based on the illumination parameter when the visual indicator is determined to satisfy the predetermined illumination condition.

6. The method according to claim 5, wherein the predetermined illumination condition comprises at least one of:
   determining the visual indicator is located on a side of the device that is determined not to be facing down; or
   determining a current time corresponds to a predetermined illumination period, wherein the predetermined illumination period identifies a predetermined period for controlling the visual indicator to illuminate.

7. The method according to claim 1, wherein the visual indicator is at least one of a dedicated light separate from a display included on the device, a portion of the display included on the device, or a flash light disposed in the device.

8. A device for controlling illumination of a visual indicator disposed on the device, comprising:
   an environmental sensor configured to acquire environmental information representing an environmental illumination level within a vicinity of the device; and
   a processor configured to communicate with the environmental sensor, and further configured to:
      control the sensor to acquire the environmental information;
      determine an illumination parameter of the visual indicator based on the acquired environmental information, wherein the visual indicator comprises a light configured to indicate a state of the device; and
      control an illumination level of the visual indicator based on the determined illumination parameter;
      wherein the processor is further configured to determine the illumination parameter by determining a target brightness of the visual indicator based on the acquired environmental information; and wherein the processor is configured to determine the target brightness of the visual indicator by:
- determining a display brightness of a display included on the device based on the acquired environmental information; and
- determining the target brightness of the visual indicator to be in proportion with the determined display brightness.

9. The device according to claim 8, wherein the processor is configured to determine the illumination parameter by:
- determining a color temperature of the visual indicator based on the acquired environmental information.

10. The device according to claim 9, wherein the processor is configured to determine the color temperature by:
- determining the color temperature corresponding to the acquired environmental information based on a first predetermined correspondence comprising a correspondence between the acquired environmental information and the color temperature.

11. The device according to claim 9, wherein the processor is configured to determine the color temperature by:
- acquiring a brightness range of the acquired environmental brightness information; and
- determining the color temperature corresponding to the acquired brightness range based on a second predetermined correspondence comprising a correspondence between the acquired brightness range and the color temperature.

12. The device according to claim 8, wherein the processor is further configured to:
- when a condition for triggering the visual indicator to illuminate is met, determine whether the visual indicator satisfies a predetermined illumination condition, wherein the predetermined illumination condition corresponds to a predetermined condition allowing the visual indicator to illuminate; and
- control the visual indicator not to illuminate when the visual indicator is determined not to satisfy the predetermined illumination condition;
- control the visual indicator to illuminate based on the illumination parameter when the visual indicator is determined to satisfy the predetermined illumination condition.

13. The device according to claim 12, wherein the predetermined illumination condition comprises at least one of:
- determining the visual indicator is located on a side of the device that is determined not to be facing down; or
- determining a current time corresponds to a predetermined illumination period, wherein the predetermined illumination period identifies a predetermined period allowing the visual indicator to illuminate.

14. The device according to claim 8, wherein the visual indicator is at least one of a dedicated light separate from a display included on the device, a portion of the display included on the device, or a flash light disposed on the device.

15. A non-transitory computer-readable storage medium having stored therein instructions that, when executed by a processor of a device, causes the device to perform a method for controlling illumination of a visual indicator included on the device, the method comprising:
- controlling a sensor to acquire environmental information representing an environmental illumination level within a vicinity of the device;
- determining an illumination parameter for the visual indicator based on the acquired environmental brightness information, wherein the visual indicator comprises a light configured to indicate a state of the device; and
- controlling an illumination level of the visual indicator based on the determined illumination parameter;
- wherein determining the illumination parameter comprises: determining a target brightness of the visual indicator based on the acquired environmental information; and
- wherein determining the target brightness of the visual indicator comprises:
  - determining a display brightness of a display included on the device based on the acquired environmental information; and
  - determining the target brightness of the visual indicator to be in proportion with the determined display brightness.

* * * * *